US007127220B2

(12) United States Patent
Abrams et al.

(10) Patent No.: US 7,127,220 B2
(45) Date of Patent: Oct. 24, 2006

(54) APPARATUS AND METHOD TO MONITOR AND CONTROL POWER

(76) Inventors: Ted A. Abrams, 117 Kelekent La., Cary, NC (US) 27511; Victor A. Lander, 10 Wyndham Rd., Short Hills, NJ (US) 07078; Dov C. Taub, 293 Crowells Rd., Highland Park, NJ (US) 08904

( * ) Notice: Subject to any disclaimer, the term of this patent is extended or adjusted under 35 U.S.C. 154(b) by 485 days.

(21) Appl. No.: 10/248,168

(22) Filed: Dec. 23, 2002

(65) Prior Publication Data

US 2004/0121742 A1 Jun. 24, 2004

(51) Int. Cl.
H04B 1/04 (2006.01)
(52) U.S. Cl. ................. 455/127.5; 455/115.3
(58) Field of Classification Search .......... 455/9.1, 455/115.1, 115.2, 115.3, 115.4, 127.1, 127.5
See application file for complete search history.

(56) References Cited

U.S. PATENT DOCUMENTS

| 3,778,731 | A | * | 12/1973 | Oomen ..................... 333/17.1 |
| 3,794,941 | A | | 2/1974 | Templin ..................... 333/17 |
| 3,835,379 | A | | 9/1974 | Templin ..................... 324/58 |
| 3,842,358 | A | | 10/1974 | Frazier ..................... 329/129 |
| 3,852,669 | A | | 12/1974 | Bowman et al. ............. 325/151 |
| 4,011,512 | A | | 3/1977 | Drury ....................... 325/150 |
| 4,249,258 | A | | 2/1981 | Craven ...................... 455/115 |
| 4,584,650 | A | | 4/1986 | Kozuch ...................... 364/481 |
| 4,729,129 | A | | 3/1988 | Koerner ...................... 455/117 |
| 4,823,280 | A | | 4/1989 | Mailandt et al. ............. 364/514 |
| 5,086,506 | A | | 2/1992 | Hall et al. ..................... 455/8 |
| 5,373,301 | A | * | 12/1994 | Bowers et al. ................ 343/742 |
| 5,542,096 | A | | 7/1996 | Cygan et al. .................. 455/115 |
| 5,548,820 | A | | 8/1996 | Victorin ...................... 455/67.4 |
| 5,564,086 | A | | 10/1996 | Cygan et al. .................. 455/126 |
| 5,913,154 | A | | 6/1999 | Wynn ......................... 455/127 |
| 6,137,366 | A | | 10/2000 | King ........................... 330/298 |
| 6,178,310 | B1 | | 1/2001 | Jeong ......................... 455/67.1 |
| 6,233,438 | B1 | | 5/2001 | Wynn ......................... 455/126 |
| 6,252,456 | B1 | | 6/2001 | Baker et al. .................. 330/207 |
| 6,289,216 | B1 | | 9/2001 | Koh et al. .................... 455/424 |
| 6,308,080 | B1 | * | 10/2001 | Burt et al. .................... 455/522 |
| 6,476,763 | B1 | * | 11/2002 | Allen, Jr. .................... 342/357.1 |
| 6,788,942 | B1 | * | 9/2004 | Owens et al. ................. 455/445 |
| 2002/0008579 | A1 | * | 1/2002 | Mucenieks et al. ........ 330/149 |
| 2002/0082033 | A1 | * | 6/2002 | Lohtia et al. ................ 455/517 |

* cited by examiner

Primary Examiner—Edward F. Urban
Assistant Examiner—Nhan T. Le
(74) Attorney, Agent, or Firm—Nelson Mullins Riley & Scarbor; David A. Harlow

(57) ABSTRACT

An apparatus to monitor and control power is disclosed. The apparatus may include a detector unit to detect a forward power and a reflected power. The apparatus may also include a control unit to control switching of the forward power from a first load that may be a radiating load to a second load that may be a non-radiating load in response to the forward power exceeding a predetermined threshold value or a voltage standing wave ratio (VSWR) exceeding a selected threshold value.

14 Claims, 4 Drawing Sheets

APPARATUS AND METHOD TO MONITOR AND CONTROL POWER

BACKGROUND OF THE INVENTION

Field of the Invention

The present invention relates to communications and more particularly to an apparatus and method to monitor and control power applied to an antenna or the like.

Wireless or cellular communication service providers or carriers can share infrastructure such as feeding networks, antennas and the like at common sites. Accordingly multiple wireless or cellular base stations each owned and maintained by different carriers can be served by shared infrastructure. The shared infrastructure can be owned and maintained by one of the carriers or by a third party. The infrastructure owner may have no control over the power that may be applied by a carrier to the infrastructure owner's feeding networks and antennas. If a problem develops, the infrastructure owner may not be able to adjust the power level or turn off the power from a base station transmitter because of contractual requirements or for other reasons. Additionally, the forward radio frequency (RF) power, the reflected RF power and the voltage standing wave ratio (VSWR) functions built into many base stations may not be able to properly sense, calculate and control operation of the base station when connected to shared infrastructure because of insertion loss or the like. An impedance mismatch between the RF feed from the base station transmitter and the infrastructure equipment may be masked by the insertion loss of the infrastructure equipment rendering the VSWR alarm circuits of the base station ineffective. Insertion loss may cause the return loss measured by the base station to be lower than actuality causing miscalculation of the VSWR and an inability of the base station to effectively sense defects in the air interface and to adjust its operating parameters accordingly and generate an alarm.

Accurate measurement of transmit power from the base station can also be important for various reasons, such as to prevent damage to equipment, electromagnetic interference (EMI) and the like. Readings of transmit power at the base station can also be erroneous because of high antenna cable loss and some of the same factors that affect VSWR.

Accordingly, there is a need to provide an apparatus and method to monitor and control power from a base station transmitter or the like when there is a problem in the base station, infrastructure equipment or other problem. Additionally, there is a need to provide an apparatus and method to control power from a base station or the like that is transparent to the base station in response to an operating parameter such as forward power, VSWR or the like exceeding predetermined threshold values or limits.

SUMMARY OF INVENTION

In accordance with an embodiment of the present invention, an apparatus to monitor and control power may include a detector unit to detect a forward power and a control unit to control switching of the forward power from a first load that may be a radiating load to a second load that may be a non-radiating load in response to the forward power exceeding a predetermined threshold value.

In accordance with another embodiment of the present invention, an apparatus to monitor and control power applied to a radiating load, such as an antenna, antenna system or the like, may include a detector unit to detect a forward power and a reflected power. A non-radiating load may be provided that is impedance matched to the antenna or antenna system. The non-radiating load may also be VSWR matched to the antenna or antenna system such that VSWR with the non-radiating load connected is less than or equal to the VSWR with the antenna or antenna system connected. A switch including a first position to apply the forward power to the antenna and a second position to apply the forward power to the non-radiating matched load may also be provided. The switch may be operated to switch from the first position to the second position in response to the forward power exceeding a predetermined threshold value or VSWR exceeding a selected threshold value.

In accordance with a further embodiment of the present invention, a method of monitoring and controlling power may include monitoring a forward power; and switching the forward power from a first load that may be a radiating load to a second load that may be a non-radiating load in response to the forward power exceeding a predetermined threshold value.

In accordance with a further embodiment of the present invention, a method of monitoring and controlling power may include monitoring a forward power and monitoring a VSWR. The method may also include switching the forward power from a first load to a second-load in response to the forward power exceeding a predetermined threshold value, the VSWR exceeding a selected threshold value or a position sensor being activated.

In accordance with yet a further embodiment of the present invention, a method of making a device to monitor and control power to an antenna, antenna system or the like may include providing a detector to detect a forward power and providing a non-radiating load that is matched to the antenna or antenna system. The method may further include providing a switch with a first position to apply the forward power to the antenna and a second position to apply the forward power to the non-radiating load. The switch may be operated to switch from the first position to the second position in response to the forward power exceeding a predetermined threshold value.

DETAILED DESCRIPTION

The following detailed description of preferred embodiments refers to the accompanying drawings which illustrate specific embodiments of the invention. Other embodiments having different structures and operations do not depart from the scope of the present invention.

Figure 1:
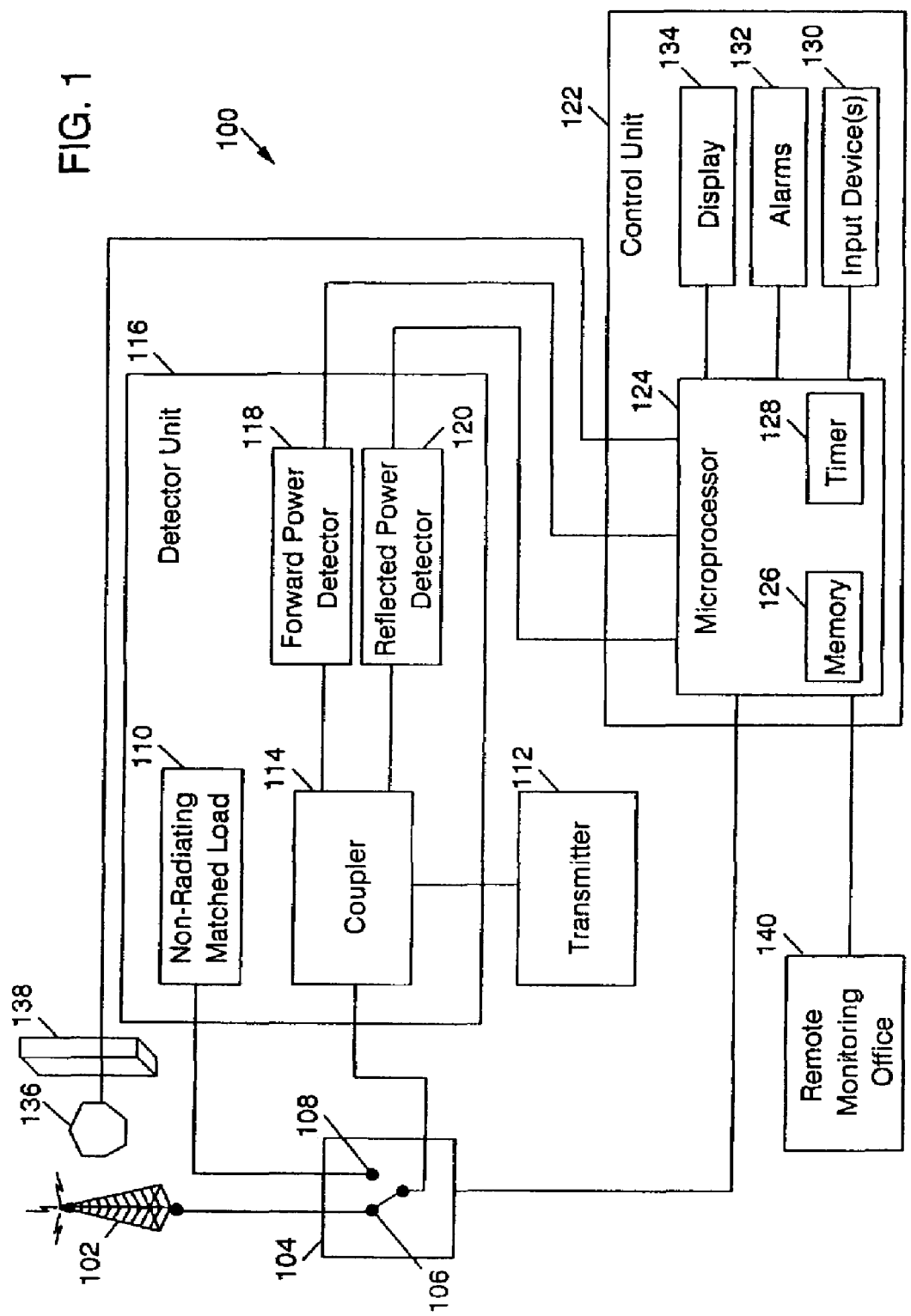
FIG. 1 is a block diagram of an example of an apparatus to monitor and control power in accordance with an embodiment of the present invention.

FIG. 1 is a block diagram of an example of an apparatus 100 to monitor and control power applied to a first load that may be a radiating load, such as an antenna 102, antenna system or the like, in accordance with an embodiment of the present invention. The antenna 102 may be coupled to a radio frequency (RF) switch 104 or similar device. The switch 104 may be coupled to a base station transmitter 112 or the like by a coupler 114. The switch 104 may include a first position 106 to apply RF power from the transmitter 112 to the antenna 102 and a second position 108 to apply the RF power from the transmitter 112 to a second load or a non-radiating load 110. The switch 104 may be a mechanical switch having sufficient power handling capacity to more than adequately conduct and switch the range of RF power expected from the transmitter 112. The switch 104 may be a mechanical or solid state type switch.

The non-radiating load 110 may be impedance matched to the antenna 102 with a selected degree of precision so as to provide a VSWR less than or equal to the antenna or antenna system. Additionally, the non-radiating matched load 110 preferably includes a predetermined mass to be able to receive an in-rush of power without effecting or causing any monitoring equipment in the transmitter 112 to be bumped or to recognize the change. Accordingly, the non-radiating load 110 is impedance matched within about 1% to the impedance of the antenna 102 or antenna system and has a predetermined mass so that switching power from the antenna 102 to the non-radiating load 110 is substantially transparent to the base station transmitter 112 and does not cause any alarms to be activated in the base station transmitter 112.

The coupler 114 and the non-radiating matched load 110 may be contained in a detector unit 116 or may be separate components. The detector unit 116 may also include a forward power detector 118 and a reflected power detector 120 each connected to the coupler 114. The forward power detector 118 may detect the forward RF power from the transmitter 112 being applied to the antenna 102 or to the non-radiating load 110, and the reflected power detector 120 may detect any reflected RF power reflected back from the antenna 102 or the non-radiating load 110. The switch 104 and the detector unit 116 including the coupler 114 and the non-radiating load 110 are preferably located within about one to about fifteen (15) feet of the antenna 102 to minimize insertion loss and preferably have a insertion loss of no more than about 0.4 dB to about 1.0 dB. Insertion loss of the connecting equipment can be entered as a correction factor during the programming of a microprocessor 124 described below.

The detector unit 116 may be coupled to a control unit 122. The control unit 122 may be at a remote location from the detector unit 116 which may be in close proximity to the antenna 102 as described above. The control unit 122 may include a microprocessor 124 or the like that may be connected to the forward power detector 118, the reflected power detector 120 and the switch 104 to control operation of the switch 104. The control unit 122 may also include a memory 126 and a timer 128 that may be part of the microprocessor 124 or may be separate components. The memory 126 may contain computer-executable instructions for controlling overall operation of the apparatus 100 and may store predetermined or selected threshold values or limits, such as a predetermined forward power threshold value, a selected VSWR threshold value or the like. The predetermined or selected threshold values or limits may be entered into the control unit 122 by a user entering the values through an input device or devices 130. The input device or devices 130 may be a keyboard, keypad, thumb wheels or the like. The control unit 122 may also include alarms 132 to alert a user when a threshold value or limit has been exceeded. The alarms 132 may include both visual and audio alarms, such as light emitting diodes (LEDs), buzzers, electronically generated sounds or the like. A display 134 may also be provided to display operating conditions, such as forward power, reflected power VSWR and the like, and status of the apparatus 100, such as threshold settings, timer settings alarms and the like. The display 134 may be a liquid crystal display (LCD) panel, cathode ray tube (CRT) or the like.

The timer 128 may measure an elapsed time of any anomaly or event, such as the duration that the forward power may exceed the predetermined threshold value or the duration that the VSWR may exceed the selected threshold value. For example, the timer 128 may be set to measure or count down a predetermined time period in response to the forward power exceeding the predetermined threshold value. If the forward power continues to exceed the predetermined threshold value during the predetermined time period or when the timer 128 expires, the microprocessor 124 may send a signal to the switch 104 to cause the switch 104 to disconnect the power from the transmitter 112 and to connect the power to the non-radiating load 110. Similarly, the timer 128 may be set to measure or count down a selected time period in response to the VSWR exceeding the selected threshold value. If the VSWR continues to exceed the selected threshold value during the selected time period or when the timer 128 expires, the microprocessor 124 may send a signal to the switch 104 to cause the switch 104 to disconnect the power from the transmitter 112 and to connect the power to the non-radiating load 110. The settings for the timer 124 may be set and adjusted by the input devices 130 and the settings may be displayed on the display 134.

The apparatus 100 may also include a position sensor 136 in the vicinity of the antenna 102 which may be within a protective electromagnetic shield 138. The electromagnetic shield 138 may block transmission of radio waves in selected directions from the antenna 102. The position sensor 136 may detect tampering or disturbance of the antenna 102 or the electromagnetic shield 136. The position sensor 136 may be connected to the microprocessor 124. The microprocessor 124 or the memory 126 may include software or computer-readable instructions to send a signal to operate the switch 104 in response to the position sensor 136 detecting tampering or disturbance of the antenna 102 or shield 136.

The apparatus 100 may be at an unmanned location and the control unit 122 may be connected to a manned, remote monitoring office 140 to control operation of the apparatus 100 on a real time basis. Operating parameters, such the timer settings, threshold values and the like may also be entered or changed by the remote monitoring office 140. The remote office 140 may also override operation of the switch 104 for one reason or another. For example, detailed analysis of the operating parameters or the like by personnel at the remote office 140 may determine that an alarm may be false or the apparatus 100 may for some reason be malfunctioning necessitating that operation of the apparatus 100 be overridden. Maintenance personnel may also be dispatched from the remote monitoring office 140 to the site of the antenna 102. The remote monitoring office 140 may monitor and control multiple apparatuses 100 at multiple different locations.

Figure 2:
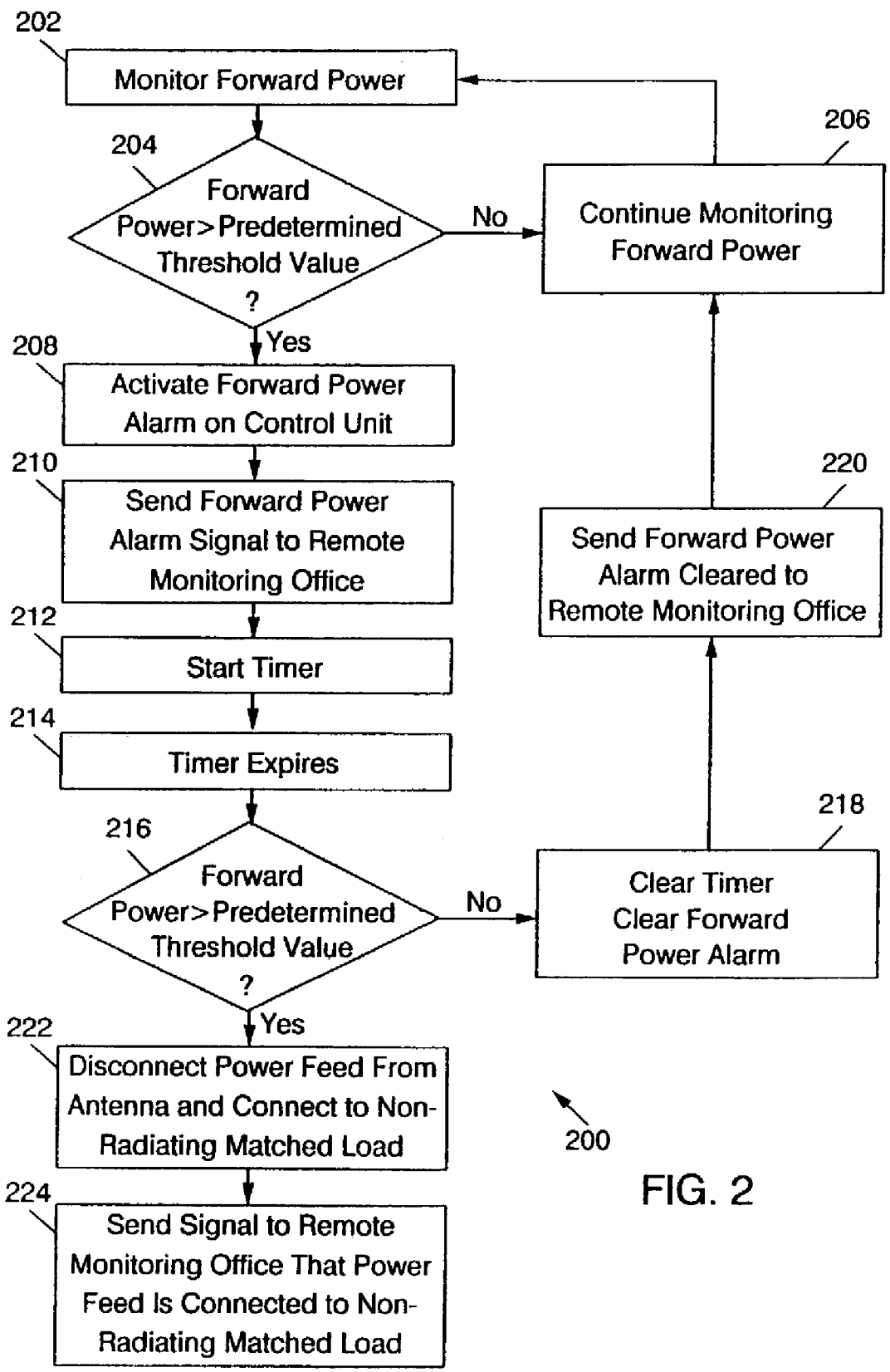
FIG. 2 is a flow chart of a method to monitor and control power in accordance with another embodiment of the present invention.

FIG. 2 is a flow chart of a method 200 to monitor and control power in accordance with an embodiment of the present invention. The method 200 may be implemented in an apparatus, such as the apparatus 100 in FIG. 1. In block 202, the forward power from a transmitter or the like, such as transmitter 112 of FIG. 1, may be monitored. If the forward power does not exceed a predetermined threshold value in decision block 204, the method 200 advances to block 206 and the apparatus 100 or the like continues to monitor the forward power. If the forward power exceeds the predetermined threshold value in decision block 204, a forward power alarm, such as one of alarms 132 on control unit 122 (FIG. 1) that may be designated as a forward power alarm, may be activated in block 208. The alarm condition and excess forward power value may be displayed on the display 134. In block 210, a forward power alarm signal may also be sent to a remote monitoring office, such as remote office 140 in FIG. 1. In block 212, a timer may be started to run for a predetermined time period. The timer may be the same as timer 128 in FIG. 1. If the timer 128 expires in block 214 and the forward power no longer exceeds the predetermined threshold value in decision block 216, the method 200 may advance to block 218. In block 218 the timer 128 may be cleared and the forward power alarm 132 may be cleared. From block 218, the method 200 may proceed to block 220 where a signal may be sent to the remote monitoring office 140 that the forward power alarm 132 is cleared. From block 220 the method 200 may advance to block 206 and the apparatus 100 may continue to monitor the forward power.

If the forward power is greater than the predetermined threshold value in decision block 216, the method 200 may advance to block 222 and the power may be disconnected from the antenna 102 or a first load and connected to the non-radiating load 110 (FIG. 1) or a second load in response to the forward power exceeding the predetermined threshold value for the predetermined time period. The loads may be switched by sending a signal from the microprocessor 124 of the control unit 122 to the switch 104 to cause the switch 104 to operate from the first position 106 connecting the transmitter 112 to the antenna 102 to the second position 108 connecting the transmitter 112 to the non-radiating load 110 (FIG. 1). In block 224 a signal may be sent to the remote monitoring office 140 that power is connected to the non-radiating matched load 110. Maintenance personnel may be dispatched or other actions may be taken to restore the forward power to a value less than the threshold value before operating the switch 104 to reconnect the antenna 102 to the transmitter 112.

Figure 3:
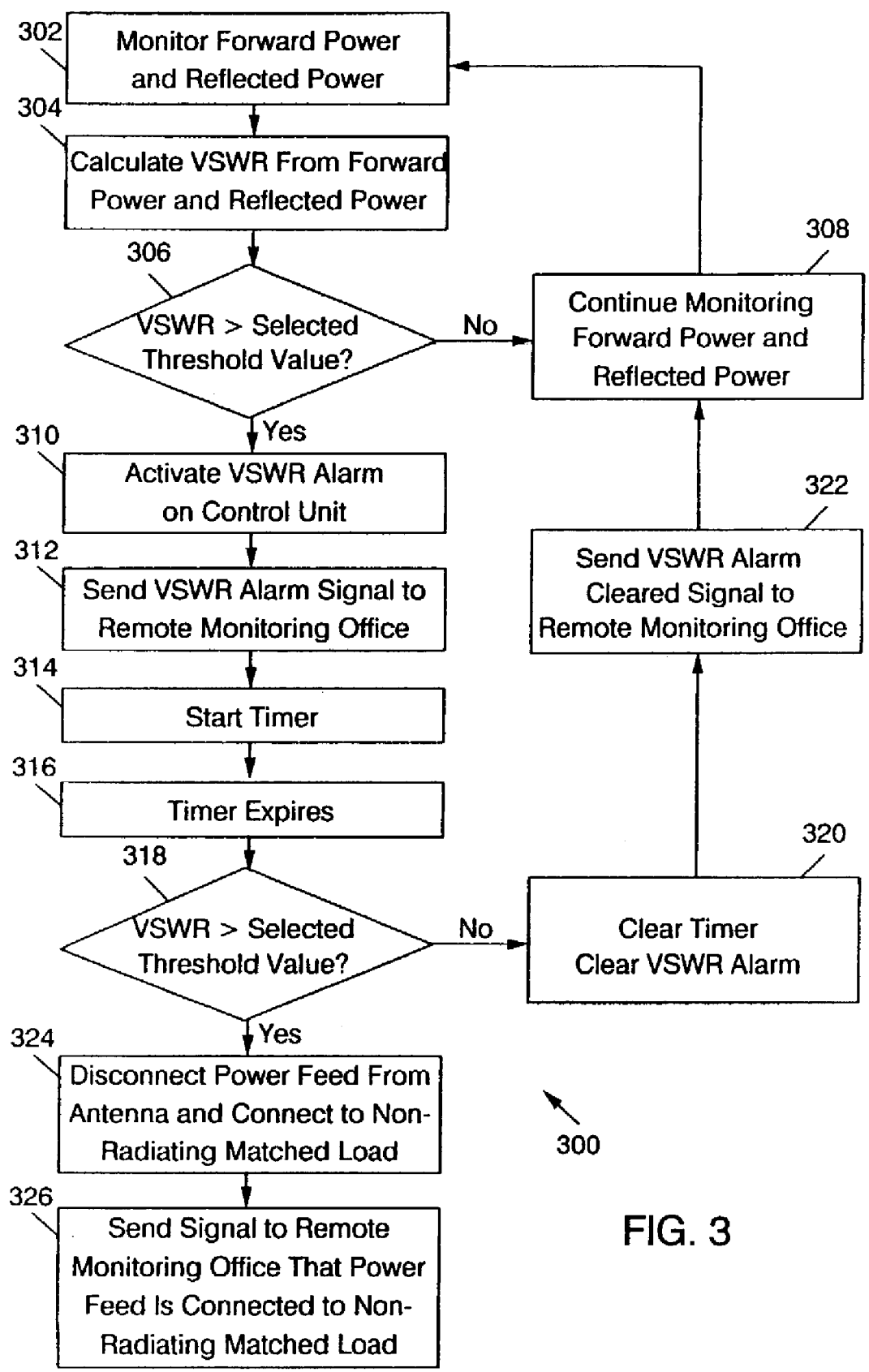
FIG. 3 is a flow chart of a method to monitor and control power in accordance with a further embodiment of the present invention.

FIG. 3 is a flow chart of a method 300 to monitor and control power in accordance with a further embodiment of the present invention. The method 300 may also be implemented in an apparatus similar to the apparatus 100 in FIG. 1. In block 302, the forward power and the reflected power from a load, such as antenna 102 in FIG. 1 may be monitored. The forward power and the reflected power may be monitored by detecting the forward power with forward power detector 118 in FIG. 1 and detecting the reflected power with reflected power detector 120. The signals from the forward power detector 118 and the reflected power detector 120 may be sent to the control unit 122 for monitoring and analysis. In block 304, a VSWR may be calculated from the forward power and the reflected power. The VSWR may be calculated by the microprocessor 124 in the control unit 122 and the forward power, reflected power and VSWR may be displayed on display 134 of the control unit 122 in FIG. 1. If the VSWR remains below a selected threshold value in block 306, the method 300 continues to monitor the forward power and the reflected power in block 308 and the method 300 may progress back through blocks 302, 304 and 306. If the VSWR exceeds the selected threshold value in block 306, the method 300 advances to block 310 and a VSWR alarm may be activated, such as one of the alarms 132 on control unit 122 in FIG. 1 that may be designated as a VSWR alarm. The alarm condition and excess VSWR value may also be displayed on the display 134. In block 312, a VSWR alarm signal may be sent to a remote monitoring office similar to office 140 in FIG. 1. As previously discussed, the location where apparatus 100 is located may be unmanned while the remote monitoring office 140 may be manned to take corrective action, such as dispatching maintenance personnel or overriding the apparatus 100.

In block 314, a timer, such as timer 128 in FIG. 1, may be started to time the duration that the VSWR exceeds the selected threshold value. The timer 128 may expire after a selected time period in block 316 and if the VSWR is below the selected threshold value in decision block 318, the method 300 may advance to block 320. In block 320, the timer 128 and the VSWR alarm 132 may be cleared. The method 300 may then progress to block 322 where a VSWR alarm cleared signal may be sent to the remote monitoring office 140. From block 322, the method 300 may return to block 308 where the method 300 continues to monitor the forward power and the reflected power and the method 300 may continue as before at block 302.

The power feed may be disconnected from the antenna 102 and connected to the non-radiating load 110 in block 324 in response to the VSWR exceeding the selected threshold value in block 318 for the selected time period. The power may be switched by the control unit 122 sensing that the VSWR is still above the selected threshold value. A signal may then be sent from the microprocessor 124 to the switch 104 to cause the switch 104 to operate from the first position 106 to the second position 108 to connect the power to the non-radiating matched load 110. In block 326, a signal may be sent by the control unit 122 to the remote station 140 that the power feed is connected to the non-radiating matched load 110. Personnel at the manned remote station 140 may perform additional analysis of the condition and dispatch maintenance personnel or cause the switch 104 to operate to reconnect power to the antenna 102 if a determination is made that the excessive VSWR indication or alarm is false.

Figure 4:
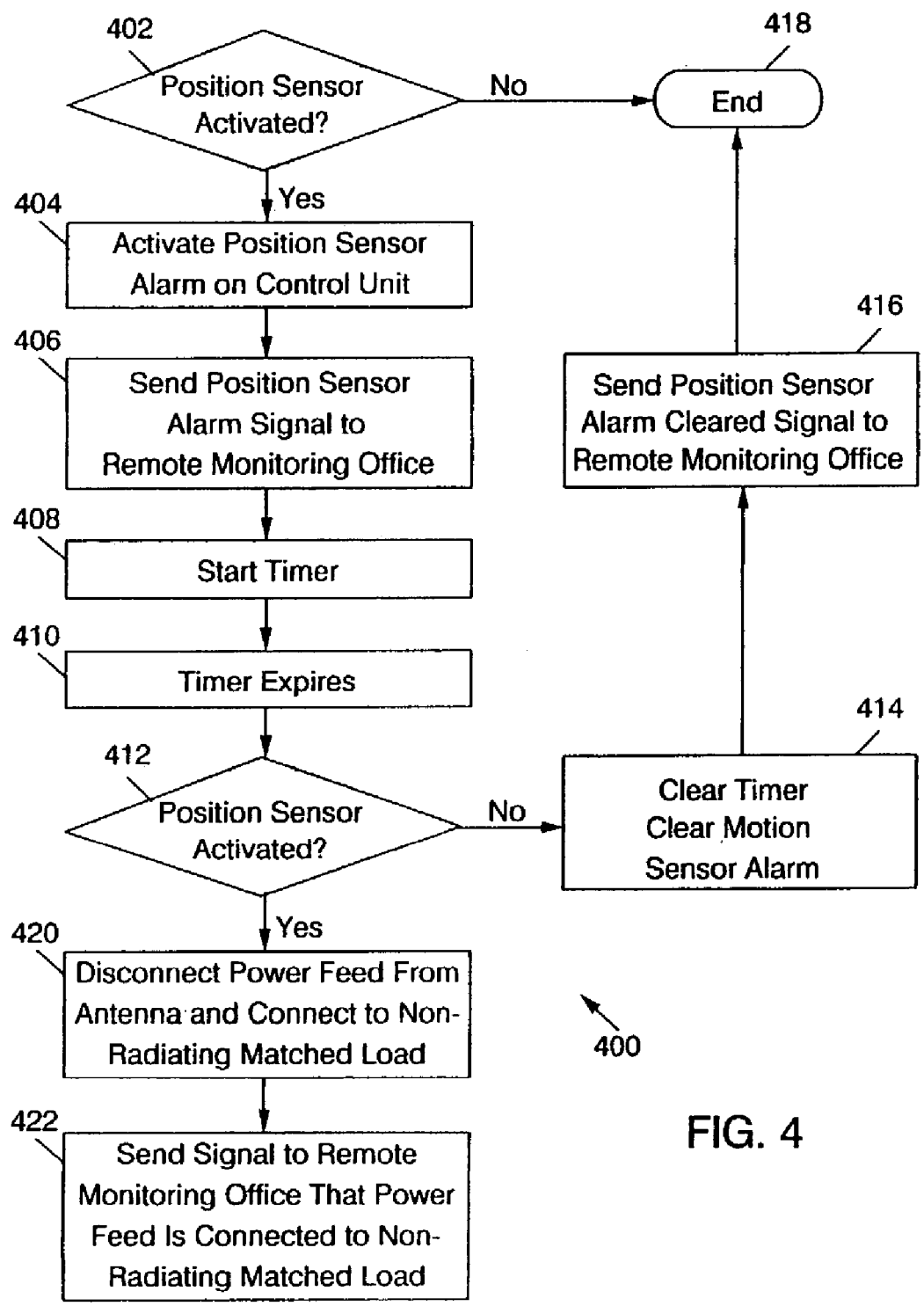
FIG. 4 is a flow chart of a method to control power applied to a load in accordance with a further embodiment of the present invention.

FIG. 4 is a flow chart of a method 400 to control power applied to a load in accordance with a further embodiment of the present invention. The method 400 may also be implemented by an apparatus, such as the apparatus 100 in FIG. 1 or the like and will be described with reference also to FIG. 1. If the position sensor 136 in FIG. 1 is activated in block 402, a position sensor alarm may be activated in block 404. The position sensor alarm may be one of the alarms 132 in FIG. 1 that may be labeled or otherwise identified as a position sensor alarm. A position sensor alarm indication may also be displayed on the display 134 in FIG. 1. In block 406, a position sensor alarm signal may be sent to the remote monitoring office 140 and the timer 128 may be started in block 408. After a chosen time period, the timer 128 may expire in block 410 and if the position sensor 136 is no longer active in decision block 412, the method 400 may advance to block 414. In block 414, the timer 128 and the position sensor alarm 132 may be cleared and the method 400 may advance to block 416. In block 416, a position sensor alarm cleared signal may be sent to the remote monitoring office 140 and the method 400 may terminate at block 418 until the position sensor 136 may be activated again in block 402.

If the position sensor 136 is still active after the chosen time period, the power feed may be disconnected from the antenna 102 and connected to the non-radiating matched load 110 in block 420 in response to the position sensor 136 being active for the chosen time period. The power feed may be switched form the antenna 102 to the non-radiating load 110 by the control unit 122 sensing that the position sensor 136 is still active after the chosen time period and the microprocessor 124 may send a signal to cause the switch 104 to operate from the first position 106 to the second position 108. In block 422, a signal may be sent to the remote monitoring office 140 that the power feed is connected to the non-radiating matched load 110. The remote monitoring office 140 may take action, such as dispatch maintenance personnel, override the apparatus 100 to reconnect the antenna 102 or perform other actions.

Although specific embodiments have been illustrated and described herein, those of ordinary skill in the art appreciate that any arrangement which is calculated to achieve the same purpose may be substituted for the specific embodiments shown and that the invention has other applications in other environments. This application is intended to cover any adaptations or variations of the present invention. The following claims are in no way intended to limit the scope of the invention to the specific embodiments described herein.

The invention claimed is:

1. An apparatus to monitor and control power comprising:
   a detector unit comprising:
      a forward power detector to detect a forward power applied to a first load, and
      a reflected power detector to detect a reflected power from the first load;
   a control unit in communication with the detector unit,
      wherein the control unit determines a voltage standing wave ratio (VSWR) from the forward power and the reflected power using information from the detector unit, and causes the forward power to be switched from the first load to the second load in response to the VSWR exceeding a selected threshold value; and
   a timer in communication with the detector unit and the control unit,
   wherein the timer times a duration when the forward power exceeds the predetermined threshold value or when the VSWR exceeds the selected threshold value, and wherein the forward power is switched from the first load to the second load in response to the forward power exceeding the predetermined threshold value for a predetermined time period or in response to the VSWR exceeding the selected threshold value for a selected time period.

2. An apparatus to monitor and control power applied to a radiating load, comprising:
   a detector unit to detect a forward power and a reflected power;
   a coupler to couple a transmitter to the radiating load,
      wherein the detector unit is in communication with the coupler;
   a non-radiating load that is impedance matched to the radiating load,
      wherein the non-radiating load comprises a predetermined mass to receive an in rush of power without effecting a transmitter in response to power from the transmitter being switched from the radiating load to the non-radiating load; and
   a switch including a first position to apply the forward power to the radiating load and a second position to apply the forward power to the non-radiating load,
      wherein the switch is operated to switch from the first position to the second position in response to the forward power exceeding a predetermined threshold value or a voltage standing wave ratio (VSWR) exceeding a selected threshold value.

3. The apparatus of claim 2, wherein the non-radiating load is impedance matched to within about 1% of the impedance of the radiating load.

4. An apparatus to monitor and control power applied to a radiating load, comprising:
   a detector unit to detect a forward power and a reflected power;
   a non-radiating load that is impedance matched to the radiating load;
   a switch including a first position to apply the forward power to the radiating load and a second position to apply the forward power to the non-radiating load,
      wherein the switch is operated to switch from the first position to the second position in response to the forward power exceeding a predetermined threshold value or a voltage standing wave ratio (VSWR) exceeding a selected threshold value;
   a control unit in communication with the detector unit and the switch,
      wherein the control unit controls operation of the switch in response to receiving a forward power signal and a reflected power signal from the detector unit;
   a timer in communication with the detector unit and the control unit,
      wherein the timer times a duration when the forward power exceeds the predetermined threshold value or when the VSWR exceeds the selected threshold value, and
      wherein the control unit sends a signal to the switch to connect the forward power to the non-radiating load in response to the forward power exceeding the predetermined threshold value for a predetermined time period or the VSWR exceeding the selected threshold value for a selected time period.

5. The apparatus of claim 4, wherein the control unit comprises an input device to adjust the predetermined threshold value, the predetermined time period, the selected threshold value and the selected time period.

6. The apparatus of claim 5, wherein the control unit comprises a display to display a plurality of parameters including the predetermined threshold value, the predetermined time period, the selected threshold value and the selected time period, the forward power, the reflected power and the VSWR.

7. The apparatus of claim 4 further comprising a remote office to remotely monitor and control operation of the apparatus.

8. The apparatus of claim 4 further comprising at least, one alarm to indicate when the forward power exceeds the predetermined threshold value and the VSWR exceeds the selected threshold value.

9. The apparatus of claim 4 further comprising a position, sensor, wherein the switch is operated from the first position to the second position in response to the position sensor being activated.

10. A method of monitoring and controlling power comprising:
    monitoring a forward power; and switching the forward power from a first load to a second load in response to the forward power exceeding a predetermined threshold value;

matching the second load to the first load to provide a VSWR for the second load that is less than or equal to a VSWR of the first load;

activating an alarm in response to the forward power exceeding the predetermined threshold value;

starting a timer in response to the forward power exceeding the predetermined threshold value;

clearing the timer and any alarm in response to the forward power exceeding the predetermined threshold value less than a predetermined time period; and sending a clear alarm signal to a remote office in response to the forward power exceeding the predetermined threshold value less than a predetermined time period.

11. The method of claim 10 wherein the forward power is switched from the first load to the second load in response to the forward power exceeding the predetermined threshold value for a predetermined time period.

12. The method of claim 10 further comprising: monitoring a VSWR; and switching the forward power from the first load to the second load in response to the VSWR exceeding a selected threshold value.

13. The method of claim 10 further comprising switching, from the first load to the second load in response to a position sensor being activated.

14. A method of making an apparatus to monitor and control power to an antenna, comprising:

providing a detector to detect a forward power; providing a non-radiating load that is matched to the antenna;

providing a switch including a first position to apply the forward power to the antenna and a second position to apply the forward power to the non-radiating load, wherein the switch is operable to switch from the first position to the second position in response to the forward power exceeding a predetermined threshold value;

providing a control unit to control operation of the switch in response to receiving a forward power signal, wherein the control unit operates the switch in response to a VSWR exceeding a selected threshold value; and coupling a remote monitoring office to the apparatus.

* * * * *

UNITED STATES PATENT AND TRADEMARK OFFICE
CERTIFICATE OF CORRECTION

PATENT NO. : 7,127,220 B2  Page 1 of 1
APPLICATION NO. : 10/248168
DATED : October 24, 2006
INVENTOR(S) : Abrams et al.

It is certified that error appears in the above-identified patent and that said Letters Patent is hereby corrected as shown below:

On the title page (73), add the following: Spectrasite Communications, Inc., Cary, N. C.

Signed and Sealed this

Twenty-sixth Day of August, 2008

JON W. DUDAS
*Director of the United States Patent and Trademark Office*